US008666077B2

(12) United States Patent
Patel et al.

(10) Patent No.: US 8,666,077 B2
(45) Date of Patent: Mar. 4, 2014

(54) TRAFFIC ENCRYPTION KEY GENERATION IN A WIRELESS COMMUNICATION NETWORK

(75) Inventors: Sarvar Patel, Montville, NJ (US); Semyon Mizikovsky, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1201 days.

(21) Appl. No.: 12/149,720

(22) Filed: May 7, 2008

(65) Prior Publication Data
US 2009/0280774 A1 Nov. 12, 2009

(51) Int. Cl.
*H04M 3/16* (2006.01)
*H04K 1/00* (2006.01)

(52) U.S. Cl.
USPC ........... 380/272; 370/252; 370/254; 370/331; 380/44; 380/270; 380/273; 380/277; 455/410; 455/411; 455/436; 713/171; 713/175

(58) Field of Classification Search
USPC .......... 380/255, 264, 265, 270; 455/410, 411, 455/437; 713/160, 171, 176
See application file for complete search history.

(56) References Cited

U.S. PATENT DOCUMENTS

| | | | | |
|---|---|---|---|---|
| 5,237,612 | A * | 8/1993 | Raith | 380/247 |
| 6,980,658 | B1 * | 12/2005 | Rezaiifar et al. | 380/274 |
| 7,561,692 | B2 * | 7/2009 | Altshuller et al. | 380/247 |
| 7,602,918 | B2 * | 10/2009 | Mizikovsky et al. | 380/270 |
| 7,752,441 | B2 * | 7/2010 | Mizikovsky et al. | 713/168 |
| 2007/0003062 | A1 * | 1/2007 | Mizikovsky et al. | 380/270 |
| 2007/0168662 | A1 * | 7/2007 | Escott et al. | 713/168 |
| 2007/0192605 | A1 | 8/2007 | Mizikovsky et al. | |
| 2007/0201697 | A1 | 8/2007 | Altshuller et al. | |
| 2007/0260885 | A1 | 11/2007 | Yegani et al. | |
| 2007/0291686 | A1 | 12/2007 | Fiat | |
| 2008/0137853 | A1 | 6/2008 | Mizikovsky et al. | |
| 2009/0164788 | A1 * | 6/2009 | Cho et al. | 713/175 |

FOREIGN PATENT DOCUMENTS

| | | |
|---|---|---|
| EP | 1 881 638 | 1/2009 |
| JP | 2004-529595 | 9/2004 |
| WO | WO 02/101980 | 12/2002 |
| WO | WO 2007/084863 | 7/2007 |
| WO | WO 2007/094989 | 8/2007 |
| WO | WO 2007/120024 | 10/2007 |

OTHER PUBLICATIONS

International Search Report and Written Opinion dated Jul. 30, 2009.
International Preliminary Search Report dated Nov. 18, 2010.

(Continued)

*Primary Examiner* — Anthony Addy
*Assistant Examiner* — Michael S Bush
(74) *Attorney, Agent, or Firm* — Harness, Dickey & Pierce

(57) ABSTRACT

In one embodiment, a traffic encryption key is generated based on a count value associated with a mobile. The count value is indicative of network accesses by a mobile, and the traffic encryption key is for encrypting communication traffic between the mobile and a base station. Generation of the traffic encryption key at a base station may be triggered by receipt of a message indicating that the mobile may handoff to the base station. In this embodiment, the message includes the count value. In another embodiment, the traffic encryption key is generated based on the count value and a key count. The mobile may trigger updating the traffic encryption key by changing the key count, and sending the new key count to the base station in a traffic encryption key update request message.

17 Claims, 6 Drawing Sheets

(56) References Cited

OTHER PUBLICATIONS

Japanese Office Action for 2011-508477 mailed Dec. 11, 2012 with English language translation.
Pang et al. "Overview and Analysis of IEEE 802.16e Security", Institute of Technology, Chinese Academy of Sciences, (2006).
Ergen, Dr. Mustafa, "The Access Service Network in WiMAX: The Role of ASN-GW", WiChorus, Inc., (2007).
Perkins, C., "IP Mobility Support for IPv4", Nokia Research Center, Aug. 2002.
WiMAX Forum, Mobile WiMAX—Part I: A Technical Overview and Performance Evaluation, Aug. 2006.
WiMAX Forum, "WiMAX Forum Network Architecture (Stage 2: Architecture Tenets, Reference Model and Reference Points) [WiMAX Interworking with DSL]", Release 1, Version 1.2, Jan. 11, 2008.
WiMAX Forum, "WiMAX Forum Network Architecture (Stage 2: Architecture Tenets, Reference Model and Reference Points) [3GPP—WiMAX Interworking]", Release 1, Version 1.2, Jan. 11, 2008.
WiMAX Forum, "WiMAX Forum Network Architecture (Stage 2: Architecture Tenets, Reference Model and Reference Points) [Stage 2 and Stage 3 Abbreviations]", Release 1, Version 1.2, Jan. 11, 2008.
WiMAX Forum, "WiMAX Forum Network Architecture (Stage 2: Architecture Tenets, Reference Model and Reference Points) [Part 0]", Release 1, Version 1.2, Jan. 11, 2008.
WiMAX Forum, "WiMAX Forum Network Architecture (Stage 2: Architecture Tenets, Reference Model and Reference Points) [Part 1]", Release 1, Version 1.2, Jan. 11, 2008.
WiMAX Forum, "WiMAX Forum Network Architecture (Stage 2: Architecture Tenets, Reference Model and Reference Points) [Part 2]", Release 1, Version 1.2, Jan. 11, 2008.
WiMAX Forum, "WiMAX Forum Network Architecture (Stage 2: Architecture Tenets, Reference Model and Reference Points) [Part 3—Informative Annex]", Release 1, Version 1.2, Jan. 11, 2008.
WiMAX Forum, "WiMAX Forum Network Architecture (Stage 2: Architecture Tenets, Reference Model and Reference Points) [Part 1]", Release 1.1.1, Sep. 14, 2007.
WiMAX Forum, "WiMAX Forum Network Architecture (Stage 3: Detailed Protocols and Procedures)", Release 1, Version 1.2, Jan. 11, 2008.
WiMAX Forum, "WiMAX Forum Network Architecture (Stage 3: Detailed Protocols and Procedures) [Annex: WiMAX—3GPP2 Interworking]", Release 1, Version 1.2, Jan. 11, 2008.
WiMAX Forum, "WiMAX Forum Network Architecture (Stage 3: Detailed Protocols and Procedures) [Annex: Prepaid Accounting]", Release 1, Version 1.2, Jan. 11, 2008.
WiMAX Forum, "WiMAX Forum Network Architecture (Stage 3: Detailed Protocols and Procedures) [Annex: R6/R8 ASN Anchored Mobility Scenarios]", Release 1, Version 1.2, Jan. 11, 2008.
Japanese Office Action for 2011-508477 mailed Aug. 28, 2013 with English language translation.

\* cited by examiner

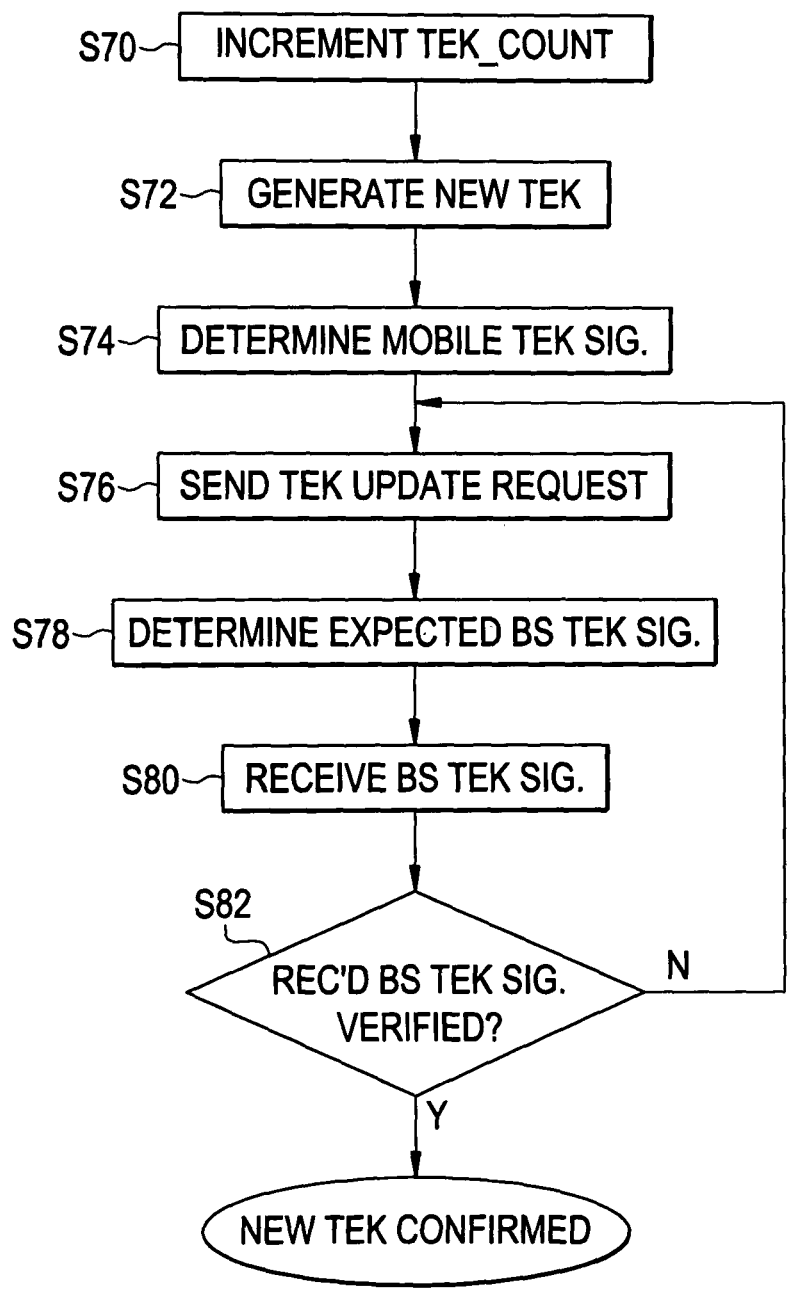

TRAFFIC ENCRYPTION KEY GENERATION IN A WIRELESS COMMUNICATION NETWORK

BACKGROUND OF THE INVENTION

WiMAX is a telecommunications technology aimed at providing wireless data communication over relatively long distances. WiMAX is based on the IEEE 802.16e standard.

FIG. 1 illustrates a portion of a conventional WiMAX system or network according to the current IEEE 802.16e standard (the WiMAX Forum Network Architecture—Stage 2, Part 1—Release 1.1.1). The system or network in FIG. 1 provides wireless services such as communication sessions (e.g., data sessions, voice sessions, multimedia sessions, etc.) to endpoints such as the plurality of mobiles or mobile nodes M1, M2, M3, . . . , MN using a mobile Internet Protocol (IP) framework, which is well-known in the art. A communication session refers to an active communication between two or more endpoints such as mobile nodes.

As discussed herein, the term "mobile" or "mobile node" refers to electronic devices having wireless communication capabilities, such as, a cellular phone, personal digital assistant (PDA), smartphone, laptop computer, etc. More generally, mobile node refers to any electronic device capable of changing its point of attachment from one network or subnetwork to another.

Referring to FIG. 1, the system includes a plurality of access service networks (ASNs) ASN1 and ASN2, a visited connectivity service network V-CSN and a home connectivity service network H-CSN. In conjunction with one another, access service networks ASN1 and ASN2, the visited connectivity service network V-CSN and the home connectivity service network H-CSN provide communications services to one or more mobile nodes M1-MN.

Each of ASN1 and ASN2 represents a communication network that provides mobile nodes with wireless access to a wired network. The access service networks ASN1 and ASN2 may be provided by a network access provider (NAP). An example access service network is a WiMAX access service network, which provides a WiMAX radio access infrastructure to WiMAX network service providers (NSPs). Although only two access service networks are shown in FIG. 1, it is well-known in the art that a WiMAX system may include any number of access service networks.

The access service network ASN1 includes one or more base stations 32-1. As discussed herein, a base station 32-1 represents any suitable device or system that provides wireless services to one or more mobiles M1 and M2 present in the coverage area or cell of the base station 32-1. As is well-known in the art, a base station comprises suitable devices operable to provide wireless services to mobile nodes located in its corresponding coverage area or cell. The base station 32-1 communicates with an ASN gateway (ASN-GW) 36-1, which is also included in access service network ASN1.

As is well-known, the ASN-GW 36-1 is a logical entity that represents an aggregation of control plane functional entities that are either paired with a corresponding function in the access service network ASN1 (e.g., an instance of a base station), a resident function in a CSN (e.g., V-CSN or H-CSN) or a function in another ASN. The ASN-GW 36-1 may also perform bearer plane routing or bridging functions.

As is well-known, each mobile node is associated with a base station, which is typically associated with a single default ASN-GW. However, ASN-GW functions for every mobile node may be distributed among multiple ASN-GWs located in one or more ASN(s).

Still referring to FIG. 1, the ASN-GW 36-1 includes a foreign agent (FA) 44-1 and an authenticator 52-1. As is well-known, the foreign agent 44-1 is a network entity (e.g., a router) that provides routing services to mobile nodes registered with the access service network ASN1. The foreign agent 44-1 routes data to and from mobile nodes currently registered with the access service network ASN1. The foreign agent 44-1 receives data intended for mobile nodes in the access service network ASN1 from the mobile nodes' assigned home agent (e.g., home agent 48 located in the visited connectivity service network V-CSN).

The well-known authenticator 52-1 is a network entity that authenticates requests for access from mobile nodes upon entering the access service network ASN1. Although authenticator 52-1 is shown as separate from foreign agent 44-1 within the ASN-GW 36-1, the authenticator 52-1 may be co-located with the foreign agent 44-1 at any suitable location.

As noted above, the system in FIG. 1 also includes access service network ASN2, which includes one or more base stations 32-2 and an ASN-GW 36-2. The ASN-GW 36-2 includes a foreign agent 44-2 and an authenticator 52-2. Each of these components and functions performed therein are the same as the corresponding components described above with regard to access service network ASN1. Thus, a description of these components is omitted.

The system in FIG. 1 further includes a visited connectivity service network V-CSN and a home connectivity service network H-CSN. Generally, a connectivity service network (CSN) is a set of network functions that provide Internet Protocol (IP) connectivity services to WiMAX subscriber(s) (mobile nodes). A CSN may provide, for example, IP addresses and endpoint parameter allocations to mobile nodes for user sessions, Internet access, AAA server, policy and admission control based on user subscription profiles, ASN-CSN tunneling support, WiMAX subscriber billing and inter-operator settlement, inter-CSN tunneling for roaming, inter-ASN mobility, WiMAX services such as location based services, and connectivity for peer-to-peer services, provisioning, authorization and/or connectivity to IP multimedia services.

As is well-known, a CSN may comprise network elements such as routers, AAA servers, user databases, interworking gateway mobile nodes. A CSN may be deployed as part of, for example, a WiMAX service provider network.

More specifically, the visited connectivity service network V-CSN represents a communication network that provides mobility management for mobiles served by access service networks ASN1 and ASN2 and also provides other operations, for example, authorization operations, host configuration management operations, etc. The visited connectivity service network V-CSN is normally provided by a network service provider (NSP).

Although the visited connectivity service network V-CSN includes all of the above-mentioned components and functionality, only a single home agent 48 and an authentication, authorization, and/or accounting (AAA) function 40 are shown for the sake of clarity. As is well-known, home agent 48 is a network entity (e.g., router) that tunnels datagrams to a mobile node when the mobile node is away from its home network. A tunnel is a path followed by a datagram while encapsulated. The home agent 48 also maintains the current location of mobile nodes to which it is assigned.

The home agent 48 is selected and assigned to serve a communication session of a particular mobile by the AAA server 42 in the home connectivity service network H-CSN and/or the AAA function 40 in the visited connectivity service network V-CSN based on policies and configurations set by the network service provider.

Within the home connectivity service network H-CSN and the visited connectivity service network V-CSN, respectively, the AAA server 42 and the AAA server 40 are network entities (e.g., servers) that provide AAA-related services (e.g., authentication, authorization, accounting, or any combination thereof) associated with a mobile node's subscription. The AAA server 42 and the AAA server 40 differ in that the AAA server 40 is located in the visited connectivity service network (V-CSN) and the AAA server 42 is located in the home connectivity service network H-CSN. Moreover, as will be described in more detail below, the AAA server 40 also differs from the AAA server 42 in that the AAA server 40 may be subordinate to the AAA server 42 in selecting and assigning a home agent to a communication session of a particular mobile. For example, the AAA server 42 may delegate the selection and assignment of the home agent to the AAA server 40 in the visited connectivity service network V-CSN. For example, if main AAA functionality is expected from the H-CSN, then the AAA server 40 in the connectivity service network V-CSN acts as the proxy transporting information to the AAA server 42 in the connectivity service network H-CSN. For the sake of clarity, the AAA server acting as a proxy will be referred to as AAA function.

As is well-known in the art, authentication refers to validating the identity of a mobile node, authorization refers to authorizing a level of service for a mobile node, and accounting refers to tracking resource usage for the mobile node.

Referring to FIG. 1, mobile nodes M1 and M2 located in access service network ASN1 are authenticated by AAA server 42 via the authenticator 52-1. Mobile node M3 located in access service network ASN2 authenticates with AAA server 42 via authenticator 52-2. Both access service networks ASN1 and ASN2 are served by the same local AAA function 40, and as such, all authentication transactions are routed via the AAA function 40.

Authentication may be conducted according to an extensible authentication protocol (EAP), which is an authentication protocol that provides an infrastructure that enables clients (mobiles) to authenticate with a central authentication server. An EAP authentication may be executed between the mobile node M1, the authenticator 52-1 implemented in an Access Serving Network Gateway (ASN-GW) ASN-1, and Authentication, Authorization, and Accounting server(AAA) 42 that handles various functions associated with authenticating and authorizing wireless communications, as well as providing billing services associated with a wireless communications. Techniques for performing the initial EAP authentication are known in the art and in the interest of clarity will not be discussed herein.

As the result of a successful EAP-based subscription authentication procedure, both the EAP client (e.g., the mobile node M1) and the EAP server (the AAA server 42) generate a master session key (MSK). The AAA server 42 assigns the lifetime for this MSK based on its policy. The lifetime (or life expiration time) of the MSK specifies for how long this security association will be valid before re-authentication. Both MSK and MSK lifetime are subsequently delivered to the authenticator 52-1 at the end of the EAP authentication procedure.

The MSK is further processed to produce the intermediate Pairwise Master Key (PMK) and subsequently the access key (AK) unique for each base station 32 that serves the mobile node. The AK is used by the base station and mobile node to generate a set of session keys specifically for the communication session while the mobile node operates though this base station. One of these keys is the key encryption key (KEK), which is generated with the purpose of protecting the traffic encryption key (TEK). The TEK is randomly created by the base station, encrypted with the KEK by using an encryption algorithm (AES), and is sent through the air interface (in the encrypted form) to the mobile node. The mobile node decrypts the TEK and uses the TEK for air traffic encryption and integrity protection.

To validate the process of establishing security association, a 3-step TEK verification transaction is optionally conducted between the mobile node and the base station, which exchange nonces and signatures with each-other, thus verifying correctness and livelihood of their AK. Transmission of encrypted TEK to the mobile node followed by the optional 3-step TEK verification is lengthy and involves heavy messaging on the air interface in the handover region, while air link quality is bad and reliability is limited.

SUMMARY OF THE INVENTION

Example embodiments are related to traffic encryption key generation.

In one embodiment, a traffic encryption key is generated based on a count value associated with a mobile. The count value is indicative of network accesses by a mobile, and the traffic encryption key is for encrypting communication traffic between the mobile and a base station.

Generation of the traffic encryption key at a base station may be triggered by receipt of a message indicating that the mobile may handoff to the base station. In this embodiment, the message includes the count value.

In another embodiment, the traffic encryption key is generated based on the count value and a key count. The mobile may trigger updating the traffic encryption key by changing the key count, and sending the new key count to the base station in a traffic encryption key update request message.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 4 illustrates operations performed at the mobile in updating the TEK used by the mobile and an associated base station.

DETAILED DESCRIPTION OF THE EMBODIMENTS

In the following description, for purposes of explanation and not limitation, specific details are set forth such as particular architectures, interfaces, techniques, etc., in order to provide a thorough understanding of the present invention. However, it will be apparent to those skilled in the art that the present invention may be practiced in other illustrative embodiments that depart from these specific details. In some instances, detailed descriptions of well-known devices, circuits, and methods are omitted so as not to obscure the description of the present invention with unnecessary detail. All principles, aspects, and embodiments of the present invention, as well as specific examples thereof, are intended to encompass both structural and functional equivalents thereof. Additionally, it is intended that such equivalents include both currently known equivalents as well as equivalents developed in the future.

Figure 1:
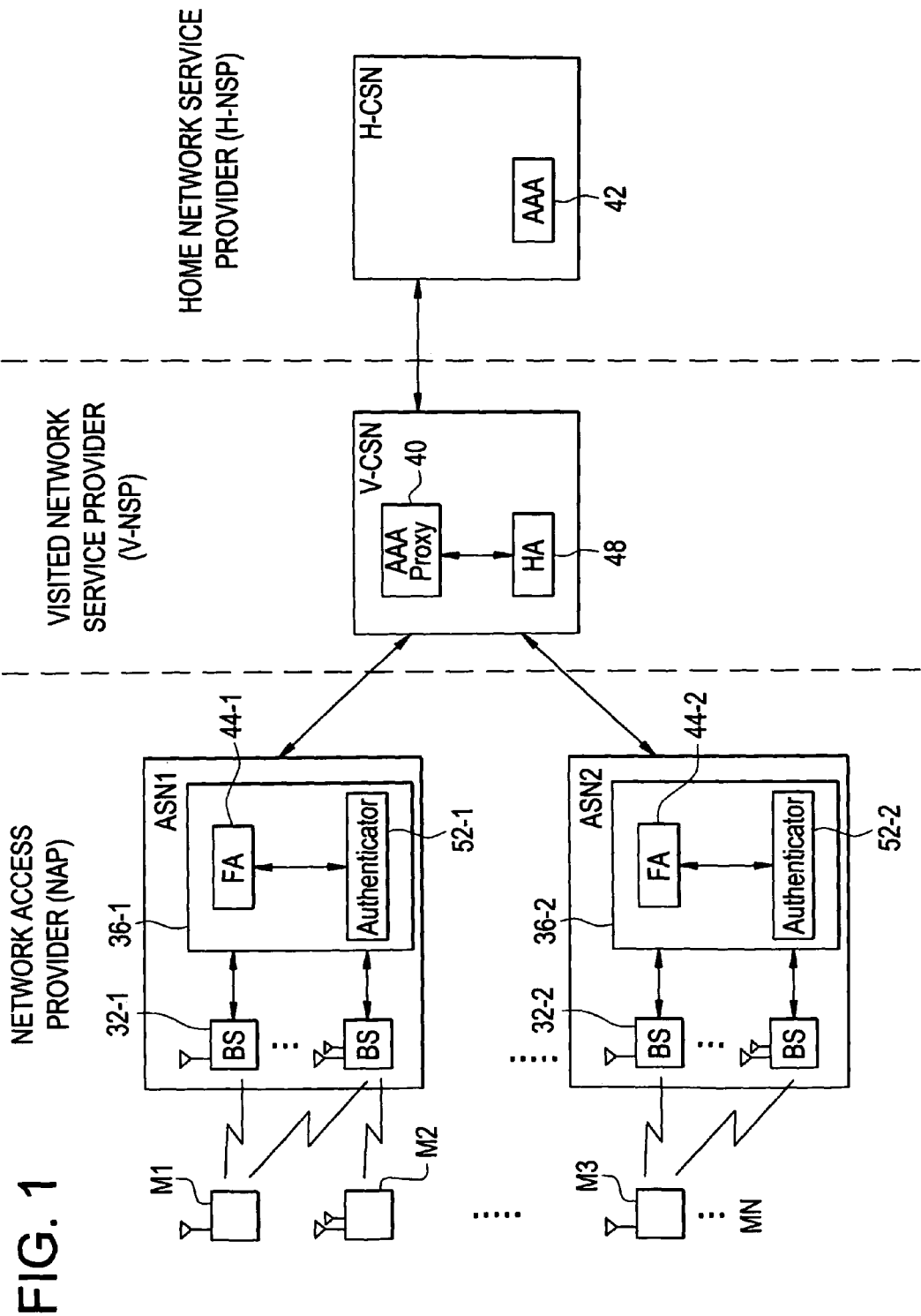
FIG. 1 illustrates a portion of a conventional WiMAX system.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware in existing communication networks. For example, program modules and functional processes discussed herein may be implemented using existing hardware at existing network elements or control nodes (e.g., a home agent or authenticator shown in FIG. 1). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

Figure 2:
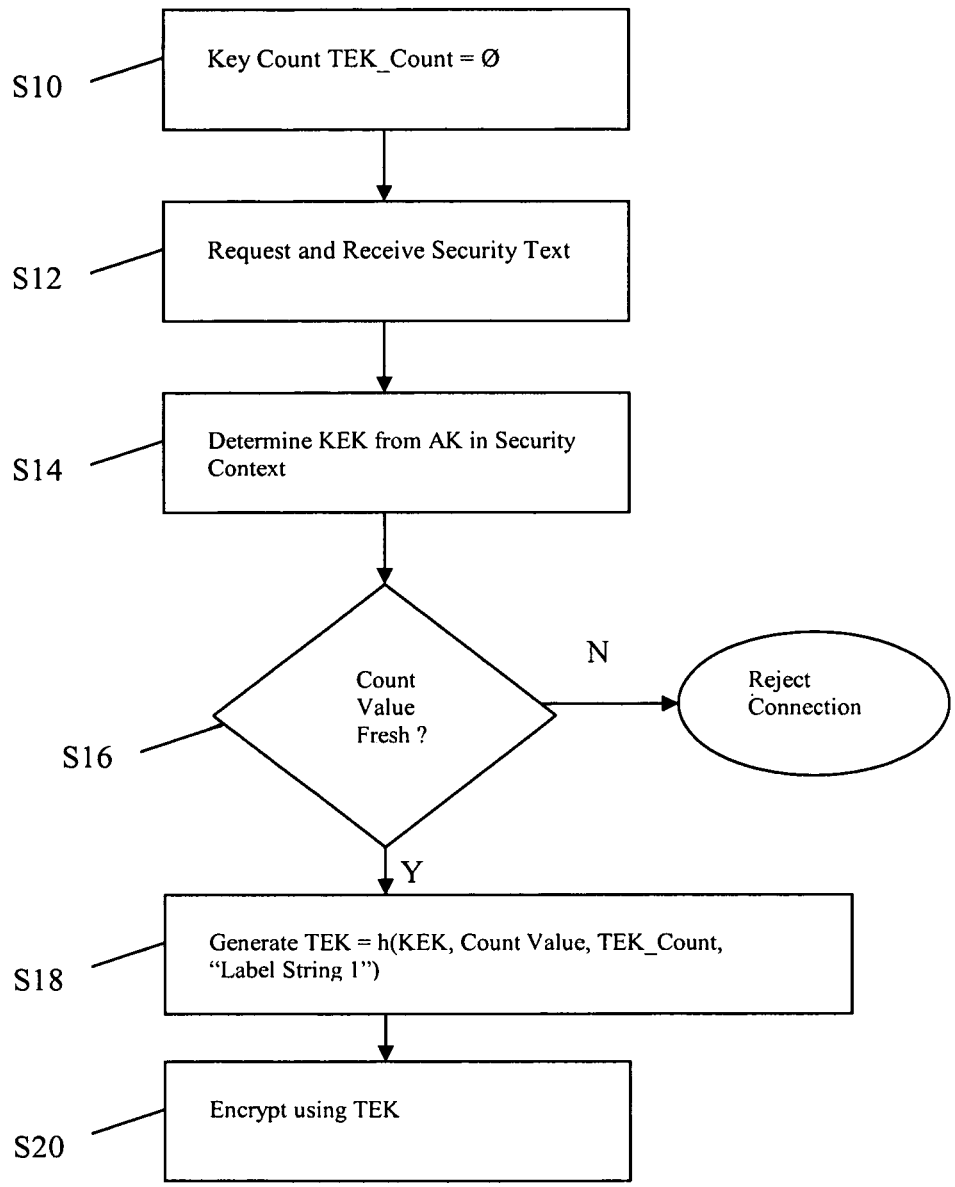
FIG. 2 is a flow chart illustrating a method for generating a traffic encryption key (TEK) at a base station according to an illustrative embodiment.

FIG. 2 is a flow chart illustrating a method for generating a traffic encryption key (TEK) at a base station according to an illustrative embodiment. The method shown in FIG. 2 will be described with regard to the example network shown in FIG. 1 and IEEE 802.16. Accordingly, any aspects/processes not disclosed in detail conform to IEEE 802.16, and these well-known aspects/processes have not been described for the sake of brevity. The embodiment of FIG. 2 assumes a non-handoff access of the network by a mobile. The case of a hand-off will be described with respect to FIGS. 3A-3B. However, it should be understood that the embodiment of FIG. 2 may be used for the hand-off situation as well.

As is well-known, a mobile attempting to access or connect to the system sends a ranging request message (e.g., RNG_REQ in IEEE 802.16). The ranging request message includes, among other things, an identifier of the mobile and a count value indicative of the number of system or network accesses by the mobile since the last authentication. For example, the count value may be the well-known CMAC_KEY_COUNT in IEEE 802.16. Upon receipt of the ranging request message, the receiving base station performs the methodology of FIG. 2.

As shown, in step S10, the base station 32 initializes a key count TEK_COUNT to zero. Then, in step S12, the base station 32 requests and receives the security context for the mobile from the authenticator 52. As will be appreciated, the base station 32 uses the identifier of the mobile, received with the ranging request, to identify the mobile for which the security context is requested. The security context includes, among other things, the access key (AK) unique to the base station 32 for this mobile and the expect count value (e.g., expected CMAC_KEY_COUNT) for the mobile. The base station 32 then determines a key encryption key (KEK) in any well-known manner using the AK in step S14. As discussed above in the Background section, generating the KEK from the AK is a well-known aspect of IEEE 802.16.

Next, the base station 32 checks whether the count value received from the mobile is fresh. As is well-known, in IEEE 802.16, the authenticator 52 stores an expected value of the CMAC_KEY_COUNT for the mobile. After each successful access by the mobile, the expected value is incremented. According to IEEE 802.16, the mobile likewise increments the CMAC_KEY_COUNT in making each access. The authenticator 52 knows which count value is associated with which mobile based on the identifier of the mobile, which is included in messages sent by the mobile.

As will be appreciated, the mobile may access other networks, and as a result, the CMAC_KEY_COUNT sent by the mobile may be greater than the expected value stored at the authenticator 52. Accordingly, in step S16, the base station 32 verifies the count value is acceptable if the count value received from the mobile is equal to or greater than the expected count value. If this condition is met, the base station 32 determines the count value received from the mobile is acceptable or fresh.

If the received count value is not acceptable (or fresh), then the connection requested by the mobile is rejected. However, if the received count value is acceptable, then in step S18, the base station 32 generates the traffic encryption key (TEK) based on the KEK, the count value, and the key count. For example the base station 32 may generate the TEK according to the following expression:

$$TEK = h(KEK, \text{count value}, TEK\_count, \text{"Label String1"}) \quad (1)$$

In expression (1), h denotes a pseudo random function such as HMAC-SHA-1. As will be appreciated, in IEEE 802.16, the count value may be CMAC_KEY_COUNT. The "Label String1" may be an alphanumeric string identifying the operation being performed. For example, the "Label String1" may be "TEK derivation."

As is well-known with respect to IEEE 802.16, the mobile also knows the AK, and derives the KEK. Accordingly, the mobile may be programmed to assume an initial TEK_COUNT of zero based on an initial access to a base station, and may be programmed with the "Label String" for TEK generation. As a result, the mobile generates the TEK using expression (1). Using the generated TEK, the mobile station and base station 32 may, in step S20, conduct encrypted traffic communication using the TEK.

Other than the ranging request, no messaging between the mobile and the base station is necessary to establish the TEK. Also, the forward and backward secrecy of the generated TEK is guaranteed by the uniqueness and secrecy of the KEK. Neither a previous base station nor a next base station serving the mobile will know this KEK. Still further, the freshness of the generated TEK is guaranteed by the validated freshness of the count value, which changes with each access by the mobile.

Figure 3A:
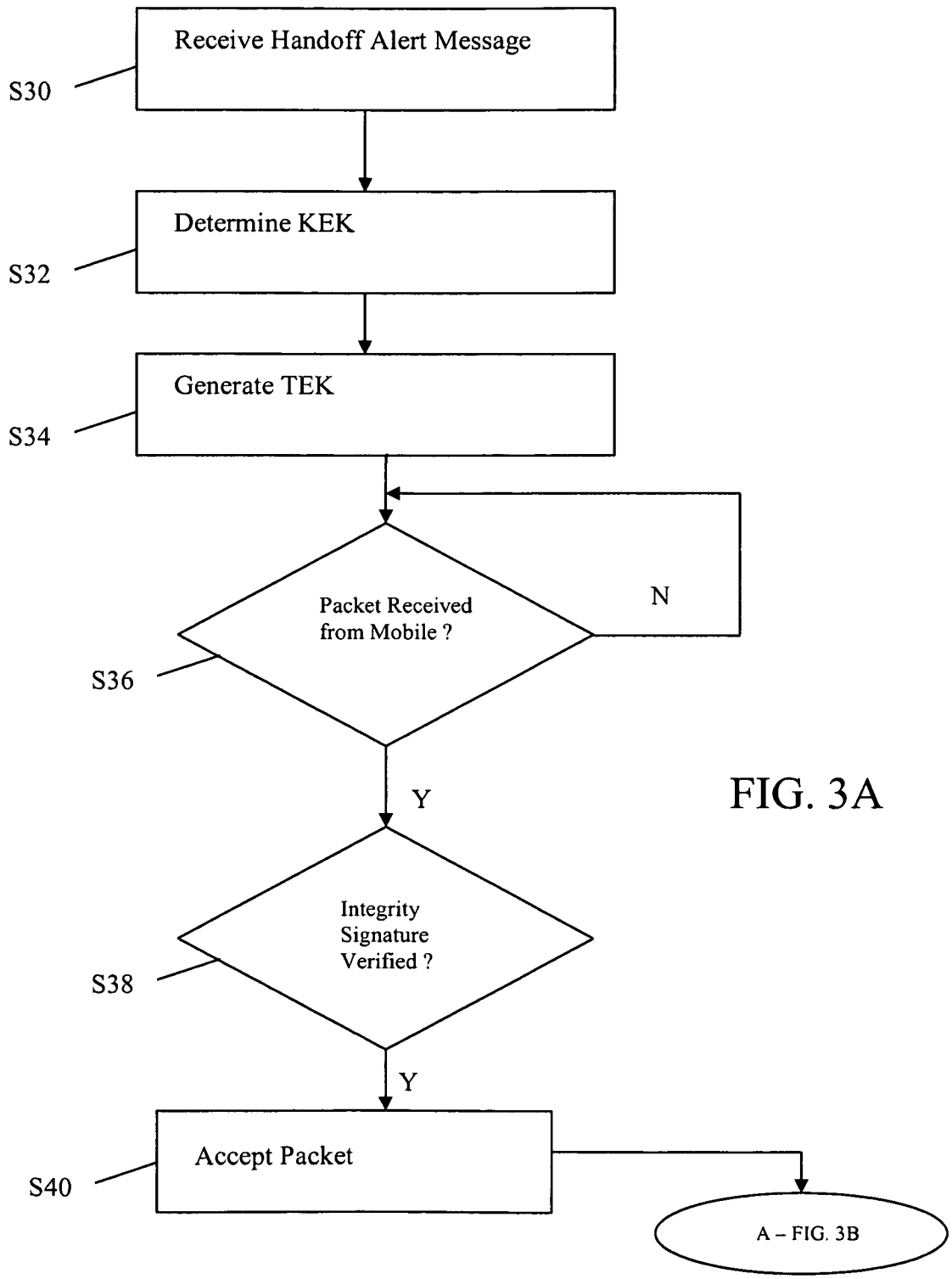
FIGS. 3A-3B illustrate a method of generating a traffic encryption key according to another embodiment.
Figure 3B:
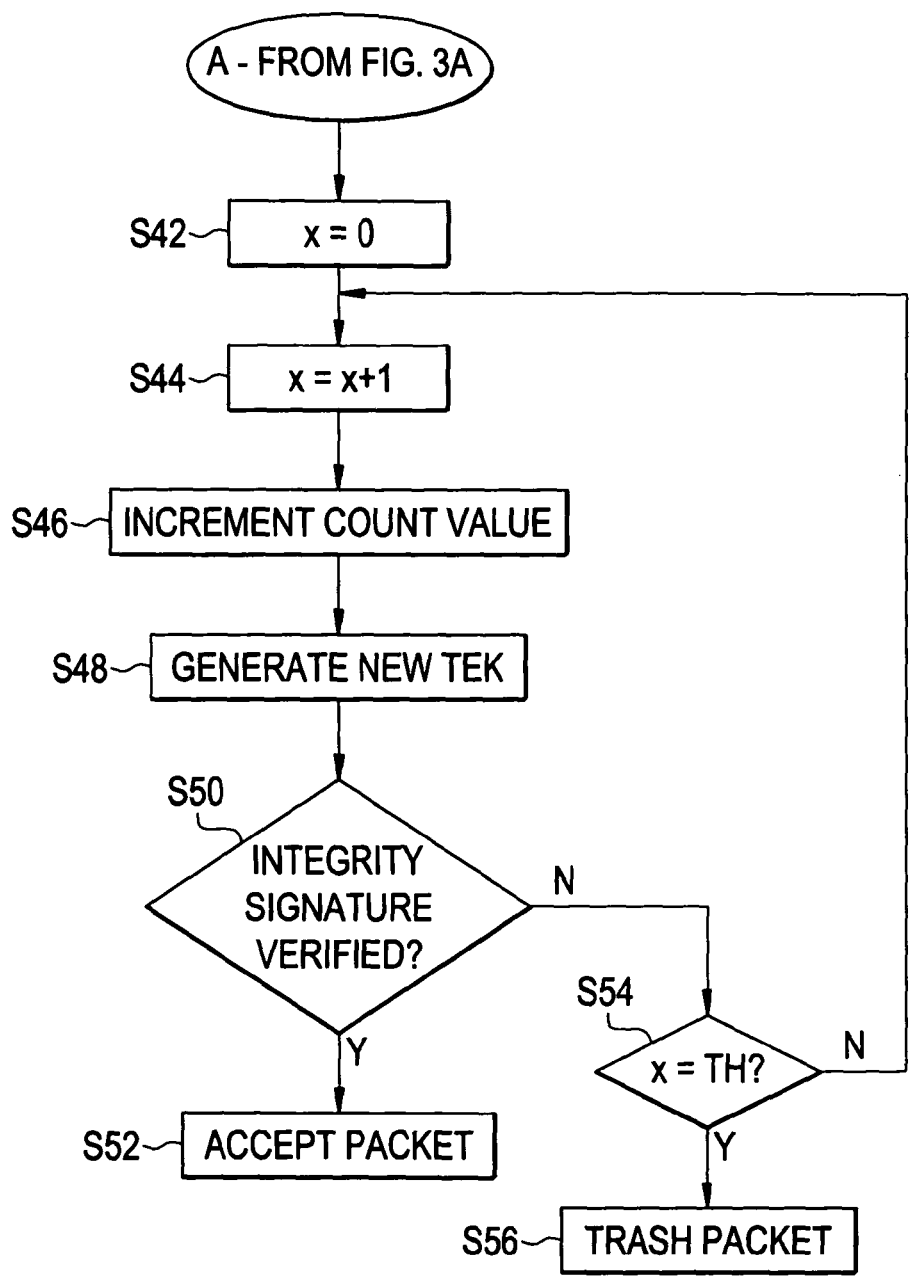

FIGS. 3A-3B illustrate a method of generating a traffic encryption key according to another embodiment. This embodiment is directed to the situation where the mobile may handoff to a target base station. The method shown in FIGS. 3A-3B will be described with regard to the example network shown in FIG. 1 and IEEE 802.16. Accordingly, any aspects/processes not disclosed in detail conform to IEEE 80.16, and these well-known aspects/processes have not been described for the sake of brevity. According to IEEE 802.16, the mobile reports to the authenticator 52 serving the mobile as to possible base stations to which the mobile may handoff. According to this embodiment, the authenticator 52 sends a handoff alert message to one or more of these candidate or target base stations. A target base station then performs the operation shown in FIGS. 3A-3B.

As shown, in step S30 of FIG. 3A, the target base station 32 receives the handoff alert message. The handoff alert message includes the identifier of the mobile and the security context for the mobile, among other thing. The security context includes among other things, the AK and count value (e.g., CMAC_KEY_COUNT in IEEE 802.16) for the mobile. In response to receiving the handoff alert message, the target base station 32 determines the KEK, in any well-known manner such as IEEE 802.16, in step S32. Using the KEK, key count TEK_COUNT of zero, the received count value and a predetermined "Label String," the target base station 32 generates the TEK according to expression (1) in step S34. In this embodiment, the "Label String" may be the same as described with respect to FIG. 2, or may be different—such as "key derivation for handoff."

In this embodiment, it is contemplated that steps S30 through S34 are performed prior to handoff and/or receiving a packet from the mobile. Given that the mobile is programmed with the "Label String" and assumes a key count TEK_COUNT of zero when handing off to a target base station 32, the mobile may generate the TEK according to expression (1) as well. As such, no messaging between the mobile and the target base station 32 is required for the mobile and target base station 32 to generate the TEK.

If the mobile decides to handoff to the target base station 32, given the above operation, the mobile may send packets encrypted using the TEK. As shown in FIG. 3A, the target base station 32 determines in step S36 whether a packet has been received from the mobile. As will be appreciated, the target base station 32 identifies packets from the mobile based on the identifier for the mobile provided with the packets. As shown, the monitoring of step S36 is repeated until a packet is received from the mobile. As will be appreciated, repeated monitoring for a packet from the mobile may be performed for a period of time, and then the process ended.

If a packet is received from the mobile in step S36, then in step S38, the target base station 32 verifies the well-known integrity signature of the mobile associated with the packet. As is well-known, when encrypting packets in the CCM mode of AES, each packet has an integrity signature. The integrity signature is also calculated using the TEK. The target base station 32 uses the TEK generated in step S34 to decrypt the packet and calculate the integrity signature. If the integrity signature calculated by the target base station 32 matches the integrity signature received in association with the packet from the mobile, then the target base station 32 accepts the packet in step S40. In this manner, the target base station 32 also verifies that the TEK generated in step S34 is correct, and the target base station 32 becomes the serving base station.

If the calculated and received integrity signatures do not match, processing proceeds to step S42 in FIG. 3B. As shown, an iteration counter X is initialized to zero in step S42, and then the iteration counter X is incremented by one in step S44. Next, in step S46, the count value used to generate the TEK in step S34 is incremented, and the TEK is re-generated by the base station 32 using expression (1) and the incremented count value in step S48.

Using this new TEK, the target base station 32 attempts to verify the integrity signature associated with the packet from the mobile in step S50. Step S50 is the same as step S38, and therefore, will not be described in detail. If verified, the packet is accepted in step S52, the target base station 32 confirms the new TEK as the correct TEK, and the target base station 32 becomes the serving base station. If the integrity signature is not verified, then in step S54, the target base station 32 determines if the iteration counter X has reached a threshold amount (e.g., 3, which would mean three iterations/increments of the count value permitted in searching for the correct TEK). If the threshold amount has been reached, then the packet is trashed in step S56. If the threshold amount has not been reached, then processing returns to step S44.

In this manner, even if the count value (e.g., CMAC_KEY_COUNT) was increased by the mobile beyond that expected at the network, the target base station 32 may still derive and confirm the correct TEK without exchanging messages over the air link with the mobile. Furthermore, as will be appreciated, because the TEK may be pre-computed by the target base station 32 and mobile prior to actual handoff (or actual receipt of a packet from the mobile), packets received from the mobile may be processed more quickly. It will further be appreciated that many of the benefits discussed above with respect to the embodiment of FIG. 2 also apply to the embodiment of FIGS. 3A-3B.

It may also be appreciated that the mobile will eventually send a ranging request that to the target base station (now the serving base station), and the base station will verify the freshness of the count value in the ranging request in the same manner as described above with respect to FIG. 2.

The embodiments of the present invention also permit updating the TEK. Updating the TEK will be described with reference to FIGS. 4-5, and this updating aspect is applicable to all of the embodiments described above (e.g., the embodiment of FIG. 2, the embodiment of FIGS. 3A-3B, etc.).

Figure 5:
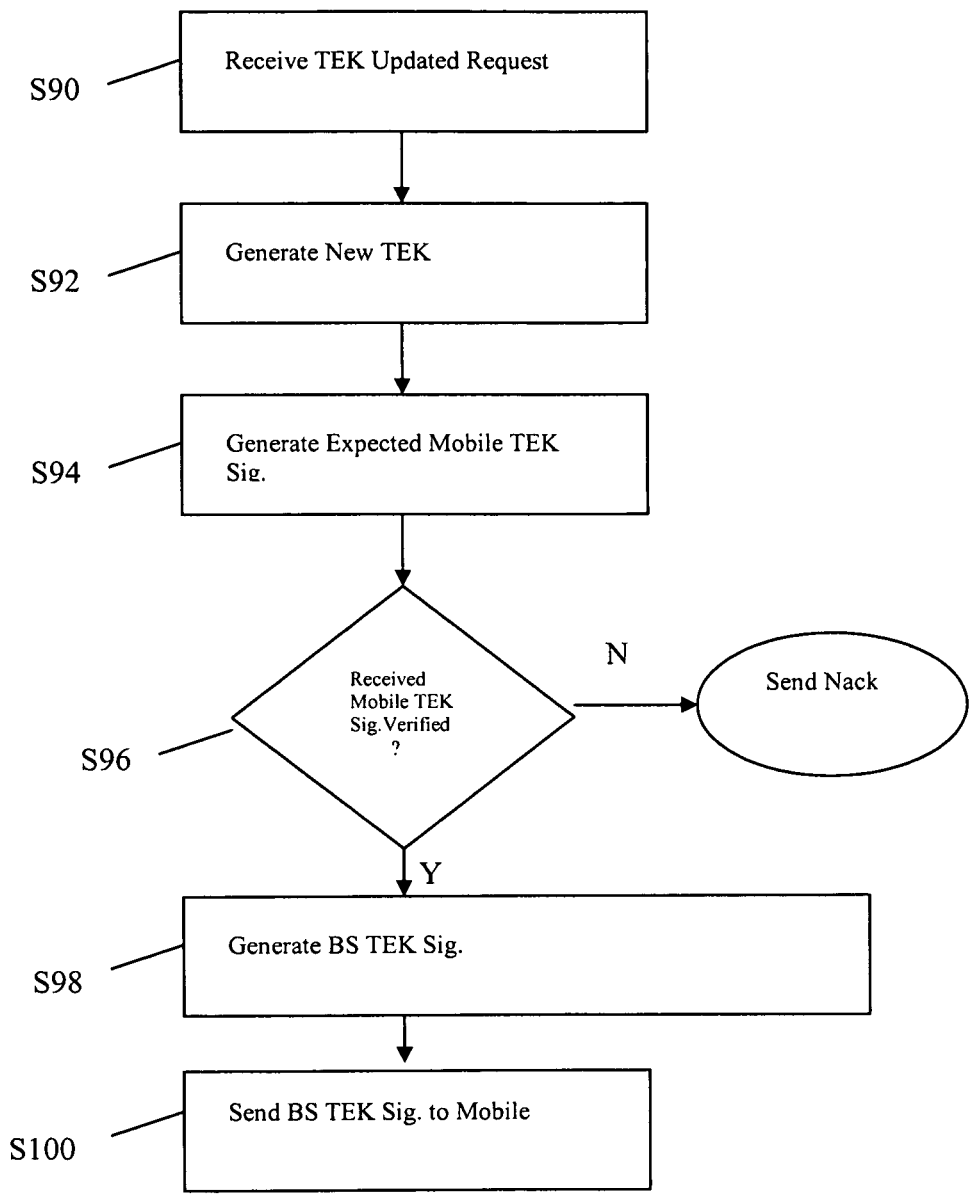
FIG. 5 illustrates the operations performed at the associated base station in updating the TEK.

FIG. 4 illustrates operations performed at the mobile in updating the TEK used by the mobile and an associated base station, while FIG. 5 illustrates the operations performed at the associated base station in updating the TEK. The methods shown in FIGS. 4-5 will be described with regard to the example network shown in FIG. 1 and IEEE 802.16. Accordingly, any aspects/processes not disclosed in detail conform to IEEE 80.16, and these well-known aspects/processes have not been described for the sake of brevity.

As shown in FIG. 4, in step S70, the mobile increments the key count TEK_COUNT. The mobile may decide to increment the key count TEK_COUNT in response to a lifetime counter expiring and/or reaching a threshold value. The lifetime counter measures a time period that the TEK has been in use. For example, if the lifetime counter reaches 12 hours, the process of FIG. 4 may be begun, and the lifetime counter reset.

After incrementing the key count TEK_COUNT, the mobile then generates the TEK according to expression (1) using the new key count value in step S72. The mobile then determines a mobile TEK signature in step S74. The mobile TEK signature may be generated according to the follow expression:

$$h(\text{new TEK}, \text{TEK\_COUNT}, \text{"Label String2"}) \quad (2)$$

In expression (2), h denotes a pseudo random function such as HMAC-SHA-1. As will be appreciated, in IEEE 802.16, the count value may be CMAC_KEY_COUNT. The "Label String2" may be an alphanumeric string identifying the operation being performed. For example, the "Label String2" may be "TEK uplink update." The mobile sends the new key count to the base station in a TEK update request in step S76. The TEK update request also includes a mobile TEK signature.

Turning to FIG. 5, the base station 32 receives the TEK update request in step S90. Using the new key count TEK_COUNT in the TEK update request, the base station 32 generates a new TEK according to expression (1) in step S92. The base station 32 also generates an expected mobile TEK signature in step S94 using the new TEK, received key count TEK_COUNT, and expression (2). Next, in step S96, the base station verifies the received mobile TEK signature by comparing the received mobile TEK signature with the expected mobile TEK signature generated in step S92. If the comparison indicates no match, then the new TEK generated in step S92 is invalidated, and the base station 32 continues to use the current TEK. The base station 32 may also send a non-acknowledgement (NACK to the mobile in response to the TEK update request. If the comparison in step S96 indicates a match, then the new TEK generated in step S92 is verified, and the base station will begin using the new TEK.

In particular, in step S98, the base station determines a base station TEK signature using the new TEK, received key count TEK_COUNT, and the following expression:

$$h(\text{new TEK}, \text{TEK\_COUNT}, \text{"Label String3"}) \quad (3)$$

In expression (3), h denotes a pseudo random function such as HMAC-SHA-1. As will be appreciated, in IEEE 802.16, the count value may be CMAC_KEY_COUNT. The "Label String3" may be an alphanumeric string identifying the operation being performed. For example, the "Label String3" may be "TEK downlink update." The base station sends the base station TEK signature to the mobile in step S100.

Returning to FIG. 4, in step S78 the mobile determines an expected base station TEK signature in the same manner as described about with respect to step S98 in FIG. 5. Accordingly, once the mobile receives the base station TEK signature in step S80, the mobile verifies the base station TEK signature in step S82.

In particular, the mobile compares the received base station TEK signature with the expected base station TEK signature generated in step S78. If the comparison indicates no match, then the mobile returns to step S74, and resends the TEK update request to the base station. If the comparison indicates a match, then the new TEK generated in step S72 is verified, and the mobile will use the new TEK in further traffic communication with the base station.

In this manner, the security association between the mobile and the base station may be dynamically updated by exchanging a very limited amount of additional information over the air link.

The invention being thus described, it will be obvious that the same may be varied in many ways. Such variations are not to be regarded as a departure from the invention, and all such modifications are intended to be included within the scope of the invention.

We claim:

1. A method of generating a traffic encryption key, comprising:
    receiving, at a base station, a message indicating that a mobile may handoff to the base station, the message including a count value, the count value indicative of network accesses by the mobile; and
    generating a traffic encryption key based on a function having as input the count value associated with the mobile and a key count, the key count being set to an initial value in response to receipt of the message, the traffic encryption key for use encrypting communication traffic between the mobile and the base station.

2. The method of claim 1, further comprising:
    updating the traffic encryption key by generating the traffic encryption key using an updated key count.

3. The method of claim 2, further comprising:
    receiving the updated key count from the mobile.

4. The method of claim 2, further comprising:
    determining a secret key; and wherein
    the generating step generates the traffic encryption key based on the count value, the key count and the secret key.

5. The method of claim 4, wherein the determining step determines the secret key from an access key unique to the base station generating the traffic encryption key.

6. The method of claim 5, further comprising:
    receiving the access key in the message.

7. The method of claim 1, wherein the generating generates the traffic encryption key before the mobile hands off to the base station.

8. The method of claim 7, further comprising:
initializing a key count in response to receipt of the message.

9. The method of claim 8, further comprising:
receiving an updated key count from the mobile; and
updating the traffic encryption key by generating the traffic encryption key using the updated key count.

10. A method of generating a traffic encryption key, comprising:
receiving, at a base station, a message indicating that a mobile may handoff to the base station, the message including a count value, the count value indicative of network accesses by the mobile;
generating a traffic encryption key based on a function having as input the count value associated with the mobile, the traffic encryption key being used for encrypting communication traffic between the mobile and the base station, the traffic encryption key being generated before the mobile hands off to the base station;
receiving a packet having an associated integrity signature from the mobile; and
verifying whether to accept the integrity signature based on the generated traffic encryption key.

11. The method of claim 10, further comprising:
when verified not to accept the integrity signature, incrementing the count value;
generating a new traffic encryption key based on the incremented count value; and
verifying whether to accept the integrity signature based on the new traffic encryption key.

12. A method of generating a traffic encryption key, comprising:
receiving, at a base station, a message indicating that a mobile may handoff to the base station, the message including an access key unique to the base station and a count value, the count value indicative of network accesses by the mobile;
determining a secret key based on the access key;
initializing a key count in response to receipt of the message; and
generating a traffic encryption key based on a function having as input the count value, the key count and the secret key, the traffic encryption key for use encrypting communication traffic between the mobile and the base station, the traffic encryption key being generated before the mobile hands off to the base station.

13. The method of claim 12, wherein the receiving receives the message from an authenticator associated with the base station.

14. A method of generating a traffic encryption key, comprising:
receiving, at a base station, a message indicating that a mobile may handoff to the base station, the message including an access key unique to the base station and a count value, the count value indicative of network accesses by the mobile;
determining a secret key based on the access key; and
generating a traffic encryption key based on a function having as an input the count value and the secret key, the traffic encryption key for use encrypting communication traffic between the mobile and the base station, the traffic encryption key being generated before the mobile hands off to the base station.

15. A method of updating a traffic encryption key, comprising:
receiving a new key count at a base station from a mobile;
generating, in response to receiving the new key count, a new traffic encryption key based on a function having as input the new key count and a count value associated with the mobile, the count value indicative of network accesses by the mobile, the traffic encryption key for encrypting communication traffic between the mobile and a base station.

16. The method of claim 15, wherein
the receiving receives an integrity signature with the new key count from the mobile; and further comprising,
determining a reference integrity signature based on the new traffic encryption key; and
verifying the new traffic encryption key is acceptable based on the integrity signature received from the mobile and the reference integrity key.

17. A method of updating a traffic encryption key, comprising:
receiving an integrity signature from a base station at a mobile;
determining a reference integrity signature based on a traffic encryption key, the traffic encryption key generated based on a function having as an input a count value associated with the mobile, the count value indicative of network accesses by the mobile, the traffic encryption key for encrypting communication traffic between the mobile and the base station; and
verifying the traffic encryption key is acceptable based on the integrity signature received from the base station and the reference integrity signature.

* * * * *